Patented Oct. 17, 1933

1,931,014

UNITED STATES PATENT OFFICE 1,931,014

MANUFACTURE OF ALCOHOLS AND ALUMINUM SULPHATE

William S. Wilson, Boston, Mass., assignor to Merrimac Chemical Company, Inc., Everett, Mass., a corporation of Massachusetts No Drawing. Application November 29, 1932
Serial No. 644,830

6 Claims. (Cl. 23—124)

This invention relates to the manufacture of alum (aluminum sulphate) from bauxite or calcined clay and it is characterized in that alcohol is obtained as a by-product of the process.

Alum is manufactured by reacting bauxite with sulphuric acid under conditions whereby a readily filterable solution containing 8–9% $Al_2O_3$ is obtained. The bauxite employed is the ordinary bauxite of commerce which contains 5–20% of acid insoluble matter consisting essentially of silica, silicates, etc. After the reaction between the bauxite and the acid is completed the mixture is filtered or decanted to recover the clear alum solution from the residue. The solution is then evaporated to approximately 17.3% $Al_2O_3$.

It is known that sulphuric acid reacts with an olefine, in the case of ethylene, to form diethyl sulphate. Heretofore it has been proposed to hydrolyze the ethyl sulphate ester mixture thus obtained at moderately elevated temperatures by the addition of water whereby ethyl alcohol is formed and sulphuric acid in dilute condition is recovered. The alcohol is separated by distillation after which the acid must be concentrated in order that it may be utilized again in the absorption of more ethylene. This procedure has certain objections. Thus, for example, the acid obtained as a result of the hydrolysis is very dilute (approximately 40%) which is necessitated by reason of the tendency under more acid conditions toward partial hydrolysis and consequent diethyl ether formation. Furthermore, ethylene is commonly associated with varying amounts of polymers, higher homologues and other impurities which undergo decomposition in the course of the absorption and which remain in the acid in the form of tars and dark colored carbonaceous impurities. The amount of tar formation is to a certain extent a function of the purity of the ethylene, temperature of the absorption, conditions of the hydrolysis, as well as other factors. However, even under good commercial condition it is impractical to eliminate these impurities in the acid which not only interferes with the efficiency of a cyclic absorption and hydrolysis operation but also causes a reduction and consequent loss of the sulphuric acid during the concentration operations.

According to the present invention the dilute (40–70%) contaminated acid resulting from the hydrolysis of the ethyl esters of sulphuric acid is heated to 175°–200° C. for a few minutes whereby the impurities are rendered separable in the subsequent step and thereafter is reacted with bauxite. Thus one obtains a filterable solution of alum in which the carbonaceous, tar-like impurities are readily and completely absorbed on the siliceous residue. In this condition the acid insoluble impurities, including the tar-like impurity, may be filtered or otherwise separated from the clear alum solution that upon evaporation produces without further purification a commercial grade of alum. Obviously, if desired, the acid may be concentrated and used several times before it is reacted with bauxite.

The sulphuric acid heat treatment may be effected conveniently in an autoclave; the precise temperature condition need not be adhered to nor is the period of heating inflexible. When the temperature of the acid is raised to 175°–200° C. the more or less colloidal carbonaceous impurities undergo a rapid change whereby they may be adsorbed or otherwise eliminated from their suspended and otherwise difficultly separable state.

Alternatively, one may effect the hydrolysis of the ethyl sulphate esters in the presence of suspended bauxite in water or weak alum solution whereby the hydrolysis reaction proceeds under acidic conditions, completely and satisfactorily at a substantially higher concentration, without ether formation, than is possible in the absence of the bauxite. As a result, the alum solution which is produced is relatively more concentrated and the cost of evaporation is reduced correspondingly.

Although the present invention is particularly well suited to the manufacture of ethyl alcohol from ethylene it may likewise be applied to the conversion of other normally gaseous olefines into the corresponding alcohols such as propylene and butylene by a procedure analogous to that set forth above and described more fully hereinafter.

The ethyl sulphate esters are produced by absorbing ethylene in concentrated sulphuric acid (preferably 100%) while maintaining a temperature not exceeding 90° C. at a pressure of 400 pounds per square inch. After the absorption subsides the mixture of ethyl sulphate esters will be found to contain approximately the equivalent of 80% of diethyl sulphate.

154 pounds of the ethyl sulphate esters, having a composition substantially as outlined above, are added slowly to a suspension of 40 pounds of bauxite in 225 pounds of water. The suspension is refluxed during the addition of the sulphate reagent. After all the reagent has been added, the refluxing is continued for a short period of time in order to complete the reaction and thereafter the alcohol is distilled from the mixture. The remaining traces of alcohol which are not eliminated readily by simple distillation may be removed by forcing steam through the charge. Thereafter 20 pounds of bauxite are added to the acid mixture which reacts with the free acid to produce an 8.5 to 9% $Al_2O_3$ solution of basic alum. The iron which is present in the solution is then reduced in the usual manner after which the alum solution is filtered free of the insoluble residue. The solution is then evaporated until it contains approximately 17.3% $Al_2O_3$. The yield of alcohol as well as aluminum sulphate is practically quantitative.

It is to be understood that one may employ ethylene in which case the alcohol product recovered is pure ethyl alcohol. On the other hand, if desired, one may employ a mixture of olefines whereby one obtains a mixture of alcohols. Thus, for example, propylene is absorbed by sulphuric acid to form the propyl hydrogen sulphate and dipropyl sulphate which upon hydrolysis yields isopropyl alcohol. Similarly, butylene yields secondary or tertiary butyl alcohol. Mixtures of the olefines will produce mixtures of alcohols. In general, however, I prefer to separate or fractionate the olefines first and thereby limit the alcohol product to a single alcohol. This is unnecessary, of course, and one may first form a mixture of alcohols and then effect the separation if required by the usual methods, for example, by fractionation.

Obviously, if desired, the amount of water in which the bauxite is suspended may be reduced or increased whereby the concentration of the resulting alum solution is correspondingly increased or decreased. Similarly, one may hydrolize the ethyl sulphate esters practically completely in the absence of bauxite, after which bauxite is added to the aqueous sulphuric acid solution containing the tar-like and other suspended and dissolved impurities. Although I prefer to hydrolyze the organic sulphates under conditions which insure an excess of acid, particularly during the latter stages of the hydrolysis since under these conditions the hydrolysis has been found to be more rapid and complete, nevertheless one may introduce all of the bauxite at the outset if desired.

It is to be understood that the amount of bauxite may be varied according to the amount of sulphate which is present in the ethyl sulphate mixture which in turn is dependent on the conditions of the absorption. One may determine the amount of sulphate present, conveniently, by hydrolyzing a representative weighed sample of the sulphate ester following in general the procedure outlined in the process and determining the quantity of alcohol by distilling the amount of sulphate in the aqueous solution after hydrolysis. The amount of ethyl sulphate and diethyl sulphate may likewise be ascertained in this manner.

From the foregoing description it will be apparent that I have discovered a method of producing alum wherein ethyl alcohol is obtained as a by-product. It will likewise be apparent that the invention affords a convenient way of disposing of the acid which is contaminated with carbonaceous and tar-like impurities that would otherwise accumulate in the acid in the course of its use as an absorbing medium for ethylene and further that the method enables one to reduce ether formation and at the same time effect complete hydrolysis of the ester to the corresponding alcohol while avoiding to a large extent the dilution of the ester as is necessary in the absence of the bauxite treatment.

What I claim is:

1. A method which comprises hydrolyzing an alkyl ester of sulphuric acid with water whereby dilute sulphuric acid and the corresponding alkyl alcohol is produced, the step which comprises effecting the hydrolysis in the presence of bauxite whereby the sulphuric acid formed is converted to aluminum sulphate.

2. The method as defined in claim 1 and further characterized in that the alkyl sulphate ester is that obtained by the inter-action of sulphuric acid and at least one olefine selected from a group consisting of the following: ethylene, propylene, and butylene.

3. The method as defined in claim 1 and further characterized in that the alkyl ester is that obtained by the inter-action of sulphuric acid and ethylene.

4. The method which comprises hydrolyzing alkyl sulphate esters in the presence of bauxite and water.

5. The method which comprises at least partially hydrolyzing with water an alkyl sulphate ester, adding bauxite to the resulting mixture whereby aluminum sulphate is formed, and completing the hydrolysis while maintaining an acid condition.

6. The method as defined in claim 5 and further characterized in that additional bauxite is added to the completely hydrolyzed mixture to convert the free acid present therein to aluminum sulphate.

WILLIAM S. WILSON.